(12) United States Patent
Gu et al.

(10) Patent No.: US 7,435,776 B2
(45) Date of Patent: Oct. 14, 2008

(54) BLOCK COPOLYMER COMPOSITION FOR OVERMOLDING ANY NYLON

(75) Inventors: Jiren Gu, Napierville, IL (US); Krishna Venkataswamy, Crystal Lake, IL (US)

(73) Assignee: GLS Corporation, Arlington Heights, IL (US)

( * ) Notice: Subject to any disclaimer, the term of this patent is extended or adjusted under 35 U.S.C. 154(b) by 533 days.

(21) Appl. No.: 11/072,817

(22) Filed: Mar. 4, 2005

(65) Prior Publication Data

US 2005/0197447 A1   Sep. 8, 2005

Related U.S. Application Data

(60) Provisional application No. 60/550,354, filed on Mar. 5, 2004.

(51) Int. Cl.
*C09J 7/02* (2006.01)
(52) U.S. Cl. ...................................... 524/505
(58) Field of Classification Search .................. 524/505
See application file for complete search history.

(56) References Cited

U.S. PATENT DOCUMENTS

| | | | |
|---|---|---|---|
| 4,578,429 A * | 3/1986 | Gergen et al. | ............... 525/291 |
| 4,614,765 A | 9/1986 | Dean | |
| 4,650,828 A | 3/1987 | Dean | |
| 5,693,718 A | 12/1997 | DeGroot et al. | |
| 5,777,031 A | 7/1998 | Djiauw et al. | |
| 5,993,900 A | 11/1999 | Hansen et al. | |
| 6,673,857 B1 * | 1/2004 | Knoll et al. | ................. 524/315 |

* cited by examiner

*Primary Examiner*—Bernard Lipman
(74) *Attorney, Agent, or Firm*—Alfred D. Lobo

(57) ABSTRACT

A thermoplastic elastomer (TPE) for overmolding (OM) a nylon substrate with an overmolded layer consists essentially of an inert filler, a plasticizer, preferably a mineral oil, and chosen combinations of ingredients from the following: (i) a functionalized "high rubber" SHDS (styrene-hydrogenated diene-styrene) having a functionality of 1%, the "small end blocks" together present in an amount in the range from about 8-25% by weight; (ii) hydrogenated SDS or SHDS block copolymer having polystyrene endblocks and a polymerized vinyl aromatic monomer in the poly(conjugated diene) midblock, the polystyrene endblocks together present in an amount in the range from 20-30% by weight of the block copolymer, excluding weight of the polystyrene in the polydiene midblock; (iii) a functionalized "high rubber" SHDS having a functionality of >1% but <2%, the "small end blocks" together present in an amount in the range from about 8-25% by weight; (iv) from 0-30% by weight of the composition, of a functionalized polyolefin (F3), the olefin having from 2 to 4 carbon atoms; (v) from 0-15% by wt of the composition, of a hydrogenated nonfunctionalized hydrogenated polystyrene-poly(conjugated diene)-polystyrene (SHDS) block coplymer; and, (vi) an additive to enhance the useful life of the composition.

9 Claims, No Drawings

BLOCK COPOLYMER COMPOSITION FOR OVERMOLDING ANY NYLON

CROSS-REFERENCE TO RELATED APPLICATION

This application claims the benefit of the filing date of Provisional Application 60/550,354 filed 5 Mar. 2004.

FIELD OF THE INVENTION

This invention relates to overmolding a shaped article made from a polyamide (nylon) which is to be overmolded with a soft outer thermoplastic elastomeric layer typically having a Shore A hardness in the range from about 20 to 80. The term "elastomeric" is used in the general sense to describe a rubbery material. Thermoplastic elastomers ("TPEs") are typically materials which exhibit properties between those of crystalline or glassy plastics and soft elastomers which latter are readily deformable by pressure between the thumb and forefinger. A TPE softens upon heating, and in a molten state, is readily thermoformed by known processing techniques, such as injection molding, blow molding or extrusion.

An overmolded layer ("OM layer" for brevity) formed from the TPE of this invention allows one to engineer a gripping means, such as the handle of a hand tool, e.g. a screwdriver, or a portion of a housing of a power tool, e.g. the gripping portions of a drill motor, or of a circular hand saw, with optimal ergonomics. It is now possible to provide a particular, desirable sensory feeling, referred to as a "good feel" combined with a "soft touch", on any portion of a predominantly nylon shaped article, irrespective of the type of nylon, and also, of some other polar substrates, e.g. acrylonitrie-butadiene-styrene (ABS) resins, polycarbonates, thermoplastic polyurethanes, thermoplastic copolyesters and copolyamides.

Further, it is now possible to tailor the "feeling" or "feel and touch" for different shaped articles, one feeling different from another, depending upon the service requirements of handles on different tools, or for door latches, handles on luggage, and the like; such "touch" and "feel" properties of the OM layer may be tailored by adjusting the physical properties of the individual components of the blend, and by adjusting the ratio in which they are present.

THE PROBLEM

The problem of bonding a predominantly rubbery block copolymer OM composition to a nylon substrate with a satisfactory bond, that is, at least 11.73 kg/cm (10 lb/in) peel strength, is difficult. The problem is three-pronged: (i) to adhere an OM layer of an elastomer tightly to a hard, molded substrate of a polar synthetic resinous material, harder than Rockwell M60, in particular any nylon in the hardness range from about Rockwell M60 to M110, irrespective of the diamine and dicarboxylic acid from which the nylon was derived, and/or whether the nylon is reinforced, e.g. with glass fiber; (ii) to do so without resorting to an adhesive between the OM layer and the substrate; and (iii) to ensure that the OM layer is rugged and durable, yet is soft to the touch, has good feel and is preferably in the range from about Shore A 20-80. A tackifying resin, which may be blended into the OM composition to associate with either the styrene phase or the rubber phase of the block copolymers herein, are not used to function as an adhesive between the OM layer and the substrate.

BACKGROUND OF THE INVENTION

To date, particularly when an available "soft" elastomer is to be directly overmolded onto a shaped article of nylon, as typically done when insert-molding an OM layer onto the article, the composition of the elastomer must be tailored to the particular nylon substrate, depending upon the molecular structure of the nylon. For example, when the nylon is ULTRAMID 1703-2, a 25% glass reinforced 6,6-nylon, it is necessary to formulate a specific combination of components for an OM elastomer layer which will adhere acceptably and serve the desired function on this particular nylon; when the substrate is ULTRAMID A3WG6 BK00564, also a 6,6-nylon, but a different molecular weight and with 30% glass fiber, it is necessary to formulate a different combination of components for an OM elastomer layer which will adhere acceptably and serve the same purpose. The differences in formulation are magnified when the differences in the nylons is greater.

As used herein, the term "nylon" is a generic term for any long-chain synthetic polymeric amide which has recurring amide groups as an integral part of the main polymer chain. To date, before the invention disclosed herein, since it is not easy to determine the Mw and particular repeating unit from which commercial nylon a shaped article was thermoformed or otherwise crafted, the process by which one arrived at a suitable self-adherent, "good-feel" OM TPE composition was by extensive trial and error.

Moreover, even when one skilled in the art conventionally formulated a OM TPE for nylon, using a "SHDS" rubber such as Kraton FG1901 with a functionality in the range from about 1.5-2%, ("SHDS" is used for brevity, to denote an at least partially hydrogenated "styrene-hydrogenated diene-styrene" which is preferably fully hydrogenated) the OM layer failed to bond satisfactorily even at high molding temperatures, particularly for insert molding, for the nylon substrates used herein. The acronym "SDS" (for styrene-diene-styrene) refers to a linear polystyrene-conjugated diene ("polydiene")-polystyrene block copolymer, polydiene typically referring to polybutadiene and/or polyisoprene in the midblock, but the acronym broadly refers to a SDS derived from a monovinyl aromatic and a conjugated diene which monomers may be mixed with other structurally related co-monomers, e.g., styrene as main aromatic component and a minor amount of α-methylstyrene.

The polydiene midblock, typically of butadiene or isoprene, gives the polymer its rubbery properties, while the polystyrene or poly(α-methylstyrene) blocks constitute the thermoplastic phase. Because the polydiene block contains double bonds (aliphatic unsaturations) which are oxidation sensitive, the TPE preferably uses hydrogenated butadiene or isoprene units, or both, so that if the TPE is an SBS (styrene-butadiene-styrene) block copolymer prior to hydrogenation, the resulting hydrogenated (styrene-ethylene/butylene-styrene) block copolymer typically has less than 5% unsaturation, preferably less than 2%. Analogously, if the TPE is an SIBS (styrene-isoprene/butadiene-styrene) block copolymer prior to hydrogenation, the resulting hydrogenated TPE is a SEEPS (styrene-ethylene/ethylene/propylene-styrene) block copolymer. The foregoing SHDS include "high vinyl" SHDS which are substantially fully hydrogenated. By "high vinyl" is meant that at least 51 mole % (percent) of the butadiene midblock is polymerized at the 1,2-position, and at least 51 mole % of the isoprene, if present, is polymerized at the 3,4-position by "driving" the polymerization with addition of a polar compound, as is well known in the art; typically the maximum in each case is 90 mole %. Such HSBCs are referred to as "high vinyl" HSBCs whether either butadiene or isoprene, or both, are present in the midblock.

There is a particular need for an OM TPE which will adhere and remain tightly adhered to a surface of a solid, predominantly nylon shaped article, irrespective of the type of polyamide from which the nylon is derived, or the additives packaged with the nylon, or the process conditions of its molding, or its aging history, and irrespective of whether the OM layer is molded by "injection overmolding" also referred to as "insert molding"; or, by "two-shot injection molding"; or, coextrusion with a nylon substrate; or, by multilayer blow-molding over a nylon substrate.

Among the more commercially relevant thermoplastic elastomers are those based on physical blends of polyolefins and rubbers, and particularly, blends of TPEs in which blends a polyamide was used to develop the bond required to securely fix the OM layer to the substrate.

For example, in U.S. Pat. No. 5,750,268 to Mace et al, a blend they made for an OM layer, required from 5 to 50% by weight ("by wt") of a "polar engineering thermoplast", referring to PA6, a 6,6-nylon.

Consistent with the belief that the polyamide was an essential component of a OM layer, U.S. Pat. No. 5,843,577 to Ouhadi et al. discloses a blend of a Santoprene® rubber, and the reaction product of a functionalized polyolefin with a polyamide, relying on the presence of the polyamide structure in the composition, to generate a strong bond when the molten blend comes into molding contact with a nylon substrate.

In contrast to the foregoing, the OM layer disclosed herein particularly relates to a TPE comprising a polyamide-free blend of block copolymers uniquely adapted to be overmolded on, and tightly adhered to any solid predominantly polyamide ("nylon") surface irrespective of the particular amide repeating unit of the nylon. The blend is particularly adapted for use in insert molding where a substrate to be over-molded is introduced at about ambient temperature at which adhesion to the surface is far more difficult than in two-shot molding where the substrate is barely solidified. The novel polyamide-free blend may be tailored to provide an OM layer at either low, average or hot temperature profiles in the barrel of an extruder or injection molding machine. It is found that the novel TPE elastomer is effective to bond to a large variety of polar substrates without the use of an adhesive between the substrate and the OM composition forming a layer.

In the recent past, wood or metal handles on a variety of hand tools such as screwdrivers, handles for power tools such as circular handsaws, and portions of containers in which tools are housed, have all been replaced with injection-molded nylon handles. The type of nylon varies from one tool to another for a variety of reasons, one of which is to accommodate the particular rigid core element to be sheathed in the nylon. Some nylons are molded over a steel shaft, as in a screwdriver or butcher's knife; some nylons are molded over a metal door handle or latch handle; some handles are made from glass fiber reinforced nylons, by injection molding. To date, irrespective of the particular nylon gripping means, all have the drawback of being "hard" on a person's hand, that is, they provide no cushioning whatsoever against impact or vibration. Such nylon gripping means are no more "user-friendly" than wood, and far less user-friendly than metal.

One approach to "soften" a handle is to cover the handle with a soft, thin, flexible cover of a foamed synthetic resinous material. Another is to overmold a soft elastomer onto the nylon, using an insert-molding procedure, such as is now commercially done with the OM6000$^+$ series of overmolding compositions provided by GLS Corporation. Prior art OM layers used a "higher functional" SHDS rubber without regard to the effect of morphological characteristics of the rubber, specifically its ability to "wet" the nylon substrate at temperatures of about 540° F. or lower, typically 360° F.-500° F.

The received wisdom is that the higher the functionality of the SHDS, the higher the statistical chance of having functional groups react with the nylon substrate. However, such "higher functional" SHDS rubbers, that is, having a functionality appreciably greater than 1%, e.g. typically 2% or more, do not adequately "wet" the substrate even if the substrate is heated by contact with the OM layer, because amide groups in the substrate are not heat-activated sufficiently to react with the functional groups on the rubber.

Quite unexpectedly, judging from the higher bonding (peel) strengths, better wetting is obtained with a hot OM composition containing a "lower functional" SHDS having a functionality of from 1% but less than 2%, when the amide groups are similarly heated.

For convenience and brevity, and also to avoid the non-specific nature of the term "lower", a SHDS having essentially 1% functionality is referred to hereinafter as "unifunctional"; and a SHDS having from >1% but <2% functionality is referred to hereinafter as "higher functional" since functionality of 2% and higher is ineffective for the purpose at hand.

Good bonding with unifunctional and higher functional SHDS contradicted the prior belief, namely, that the higher the functionality of the rubber, the better the chances of reactions between the amide groups on the substrate and the functional groups in the rubber. That belief ignored the effect that the structure and morphology of the heated functionalized rubber will have on the nylon; it also ignored the requirement of "small end blocks" or "high rubber" SHDS (the terms are used synonymously) to provide the "right" structure of polymer chains organized in a morphology that allows the functional groups on the rubber to be contiguous to the amide groups, in the first place, so they can react at the surface more easily.

The foregoing considerations and numerous relevant prior art references which routinely teach addition of mineral fillers in SHDS compositions, also failed to recognize that presence of an inert filler might be critical to establish the desired bond.

Understandably, no weight was accorded in the piror art, to the presence of a filler having no noticeable adhesive qualities, per se, in an OM layer. There was no reason to expect that a particulate, optionally fibrous, filler present in a defined concentration range in a SHDS composition, would be critical to provide a "filled" OM layer with necessary excellent adhesion to any nylon even at insert-molding conditions, without which adhesion no OM layer is useful from a practical point of view.

SUMMARY OF THE INVENTION

A combination of (a) an inert filler (b) a plasticizer and (c) a block copolymer selected from the group consisting of (C1), a SDS or SHDS rubber "(F1)" having a "small" polystyrene endblock at each end of a polydiene midblock which midblock includes a polymerized vinyl aromatic monomer, typically polystyrene, the "small" polystyrene endblocks being together present in an amount in the range from about 20% to 30% by weight of the block copolymer, not including the polystyrene in the polydiene midblock, so that (C1) has a weight average molecular weight ("Mw") high enough to be thermally stable at 282° C. (540° F.), (C2), a functionalized "high rubber" SHDS "(F2)" having a functionality of essentially 1%, the "small end blocks" together present in an amount in the range from about 8-25% by weight (that is, each endblock has a much lower molecular weight than the rubbery midblock), and (C3), a functionalized SHDS having a functionality of >1% but <2%, in which the end blocks are together present in an amount in the range from >25% -35% by weight, in any combination provided that only (C2) may be present without (C1) and (C3); provides an OM thermoplastic elastomer ("TPE") composition with requisite "wetting" resulting in excellent bonding as specified by a peel strength of at least 11.73 kg/cm (10 lb/in) when the TPE is overmolded on a predominantly nylon substrate, irrespective of the diamine and dicarboxylic acid monomers from which the nylon is derived, or how long the nylon substrate is aged, or the humidity conditions under which the substrate is aged; moreover, the OM composition is not fluid at a temperature below 149° C. (300° F.), and is necessarily essentially free of both, a polyamide component and a non-hydrogenated SDS block copolymer.

When (C2) is present without (C1) or (C3) it may be present in an amount from 10-40% of the composition. By "essentially free" is meant that, if present, an ingredient is present in an amount less than 5% by wt.

Though (c) above provides good bonding of at least 11.73 kg/cm (10 lb/in), obtained with only (C2), and with any combination of two of (C1), (C2) and (C3), superior bonding of at least 17.3 kg/cm (15 lb/in), at relatively low temperature (Profile I conditions below) is obtained with combinations of all three.

If optimum bonding is not the goal, a portion of either of (C1), (C2) or (C3) may be substituted with a hydrogenated non-functionalized SHDS block copolymer present in a range from 0-15% by wt of the OM composition.

To tailor the hardness of the composition it may include from 0-30% by wt of a functionalized polyolefin "(FP)" of one or more olefins, each having from 2 to 8 carbon atoms.

By "inert filler" is meant that the filler has no chemical reactivity with any component of the OM layer. Reference to "SDS" which are to be used in the blend of this invention refers only to block copolymers having a non-hydrogenated midblock with a controlled distribution block of a monoalkenyl arene, typically styrene. The Mw of any SDS or SHDS with polystyrene in the midblock is chosen so as to be stable at the temperature at which the substrate is molded, typically in the range from 182° C.-282° C. (360° F.-540° F.).

More particularly, it has been discovered that a preferred combination of (A) inert filler "(a)" present in an amount from 5 to 40%, preferably 10 to 35%; (B) "(C1)" present in an amount in the range from 5-25% and having a weight average Mw in the range from about 20,000 to 300,000; (C) a unifunctional high rubber SHDS "(C2)" having a functionality of 1% present in an amount from 5-25%; (D) a higher functional SHDS "(C3)" having a functionality >1% but <2% present in an amount from 5-25% in the same Mw range as (C1); (E) from 5-25% of (FP), of functionalized poly($C_2$-$C_8$) olefin, preferably polyethylene or polypropylene; all the foregoing blended with (F) a minor amount by weight, relative to the total weight of the compounded blend, of an unreactive plasticizer, provides an excellent embodiment of the foregoing overmolding ("OM") composition, provided that when (C) and (D) are both present, they are together present in an amount in the range from 5-25%. In the foregoing, "%" refers to parts per hundred parts by weight of compounded resin. Note that the amounts in "parts by weight" of various ingredients are "phr" in relation to 100 parts by weight of rubber.

It is most preferred that the small end block rubbers have a styrene content less than 20%, as the smaller endblocks facilitate wetting of the substrate surface.

Though the TPE may contain from 0-35% of (FP), a preferred formulation of the TPE includes (FP) in a range from 5 to 20%, and a paraffinic oil "(b)" in a range from 10-30%, provided further that the amount of unifunctional SHDS is present in an amount sufficient to react with amide groups of the substrate at a temperature in the range from 182° C.-282° C. (360° F.-540° F.), preferably in the absence of a curing agent. The foregoing combination is blended homogeneously with a conventional particulate or fibrous, inert, preferably mineral, filler "(a)" present in an amount in the range from about 5-35% of the blended TPE, so as to provide a minimum 11.3 kg/cm (10 lb/in) bonding to a predominantly nylon substrate. In addition, the TPE blend may include other conventional additives known in the art to improve the performance of the OM layer, including processing aids, antioxidants, antiozonants, uv light stabilizer and other conventionally added ingredients known in the art to be useful in such TPEs.

As stated, the foregoing "(C1)" may be an SDS or SHDS. When SDS, the polydiene midblock is derived from either butadiene, or isoprene, or both butadiene/isoprene; when SHDS, the hydrogenated polydiene midblock of the SDS results in midblocks of ethylene/butylene (from SBS), ethylene/propylene (from isoprene), and ethylene-ethylene/propylene and/or ethylene/propylene-3-methylbutene (EP3MB) (from SIBS). It is in these midblocks that there is a controlled distribution of polystyrene.

The structural configuration of the polymer chains of (C1) with the high rubber SHDS (C2) provides miscibility of all ingredients at the temperature to which the nylon substrate is heated when contacted with the hot OM composition, and the critical "wetting" provided and interaction which results in interaction at the surface which results in the desired bonding at the specified relatively low temperature.

Each of particular non-functionalized SHDS if present, and functionalized SHDS (C1) & (C2) have a Mw in the range from about 20,000-400,000, preferably a relatively low Mw in the range from 20,000-250,000. This range provides essential wetting which, in turn, provides the excellent bonding with the nylon substrate.

A blend of this invention having 5% inert filler, has the unique property of having its bonding strength increased by an increase in the amount of filler to 10%, all other components and conditions of molding being kept the same.

If desired, the novel TPE composition, per se, that is without being bonded to a substrate, may be used to mold soft articles, such as a teething ring for an infant or a chewable dog bone, the hardness and deformability of which can be tailored for use.

Preferred blends having desirable hardness in the range from about Shore A 20 to 80, preferably from A 35 to A 75, at room temperature, comprise the following, given in parts per 100 parts of formulated blend, including: (i) blending from 10 to 60 parts of a non-functionalized SHDS with polystyrene in the midblock, with (ii) from 10 to 45 parts of a plasticizer which associates with the rubber phase, then adding (iii) from 1 to 25 parts of a unifunctional, hydrogenated SHDS, and (iv) from 0 to 25 parts of a "higher functional"SHDS, that is, having a functionality >1% but <2%, each of which functionalized SHDS has a Mw lower than 400,000; (v) uniformly dispersing an inert mineral filler in the blend, and, optionally further blending (vi) a functionalized polyolefin in a specified amount, to provide an OM blend which bonds in the range from about 204° C. -260° C. (400° F.-500° F.) to known commercially available nylon substrates with a peel strength greater than 17.3 kg/cm (15 lb/in), and to ZYTEL 801 (substrate E, herebelow) in the range from 249°-282° C. (480°-540° F.).

A process for the preparation of an overmolded article comprises bonding a thermoplastic elastomeric overmolding composition to a nylon, by heating the OM composition specified above to a temperature in the range from about 182° C.-282° C. (360° F.-540° F.), followed by combining the heated composition with the nylon so as to overlie at least a portion of the nylon and provide a bond of at least 11.3 kg/cm (10 lb/in), preferably at least 17.3 kg/cm (15 lb/in).

An article of arbitrary shape formed from nylon is provided with a layer of the OM composition molded to at least a portion of its surface. A preferred laminated article comprises a rigid substrate of nylon having a stiffness of at least 1 Gpa, integrally overmolded with the above-specified composition without using an adhesive between the substrate and the OM later formed.

DETAILED DESCRIPTION OF PREFERRED EMBODIMENTS

In a particular, preferred embodiment which is overmolded at relatively low barrel temperatures in Profile 1 (below), the OM TPE consists essentially of (i) from 20-30% of a particulate or fibrous inert filler; (ii) from 15-25% of an unreactive mineral oil; (iii) from 10-20% of a SHDS with styrene in the polydiene midblock; (iv) from 15-25% of a SHDS rubber having a functionality of essentially 1%; (v) from 15-25% of a SHDS rubber having a functionality in the range >1% but <2%; provided that when (iv) and (v) are together present, they do not exceed 25%; (vi) from 5-10% of a functionalized polyolefin, the olefin having 2-4 carbon atoms; and (vii) at least one other additive to enhance the useful life of the composition, the functionalized rubbers and the functionalized polyolefin being each functionalized with a polar group selected from the group consisting of acid anhydride, carboxyl, carboxylic acid, and amine epoxy; and wherein, all % not referring to functionality, refer to % by wt in the blended composition.

In a preferred composition the proportions of the components are chosen to provide a hardness in the range from 30-75 Shore A.

The proportions chosen above provide superior bonding in a range above 17.3 kg/cm (15 lb/in) at barrel temperatures of Profile I.

Moderately good bonding in the range from 11.3 kg/cm (10 lb/in) to 17.3 kg/cm (15 lb/in) is provided at Profile I conditions even without the functionalized polyolefin (see Ex. 10 in Table 5). However, superior bonding in a range above 17.3 kg/cm (15 lb/in) are provided without the functionalized polyolefin (see Exs. 3, 4 in Table 5) at higher barrel temperatures of Profile III.

When the substrate is ZYTEL 801 (though it is, like ZYTEL 409AHS, a heat-stabilized nylon-6,6) the desirable bond of 15 lb/in is obtained when overmolding is at Profile III conditions where final barrel temperatures range from 520° F. to 540° F. Preferably the preferred functionalized polyolefin, whether polypropylene or polyethylene, is functionalized with a maleic anhydride, acrylic acid or acrylate group.

The Non-Functionalized Rubber with Polystyrene in the Polydiene Midblock (C1):

This rubber, "(F1)" may be non-hydrogenated (SDS) or hydrogenated (SHDS). Each has increased polarity provided by a controlled distribution block of the monoalkenyl arene (polystyrene) and conjugated diene, and the rubber has the polystyrene block in the polydiene midblock. Further, the rubber necessarily has polystyrene endblocks which together constitute from about 20% to 30% of the weight of the rubber. The higher polarity facilitates "wetting" of a hot surface of a nylon substrate. The non-hydrogenated SDS is commercially available as STYROFLEX 2G66 from BASF Corporation; hydrogenated SHDS is commercially available as KRATON A6935. Details of the A6935 rubber are believed to be disclosed in US2003/0181584 A1 published 25 Sep. 2003 and are incorporated by reference thereto as if fully set forth herein.

The Functionalized SHDS (C2) & (C3):

Functionalized SHDS may be prepared by well known methods, in particular those disclosed in U.S. Pat. Nos. 4,174, 358; 4,429,076; 4,427,828; 4,628,072; 465,791; and 4,844, 471; which are incorporated by reference thereto as if fully set forth herein. The midblock is substantially hydrogenated and grafted preferably with an unsaturated acid or anhydride in the presence of an organic peroxide, as described below in relation to the functionalized polyolefin. The unsaturated acid or anhydride is grafted in an amount of from 1 to less than 2 wt %. The SHDS are preferably grafted with a diacid, most preferably with maleic anhydride.

Preferably, the specifications for the functionalized SHDS, other than their functionalization, are essentially the same as those for the non-functionalized SHDS given above.

Examples of suitable functionalized SHDS are KRATON RP6670, KRATON FG 1901 and KRATON FG 1924 in the ranges referred to above, preferably from about 30,000-150,000.

Preferred are commercially available block copolymers such as those presently marketed under the FG1901 (styrene/rubber ratio is 30/70) and FG1924X (styrene/rubber ratio is 13/87 or 16/84) brands, the former having a functionality in the range from about 1.5%≈(to about) 2%, typically about 1.7%, the latter being essentially 1%, that is, unifunctional.

The Non-Functionalized SHDS (C3):

Preferably, the two styrene endblocks are essentially identical and each has a Mw in the range of from 3000 to 60,000; and the midblock prior to hydrogenation, has a Mw in the range of from 50,000 to 250,000, and in the high rubber SHDS used herein, it is critical that the endblocks constitute only a small portion, from 8-25% by wt, preferably from 10-25% by wt, of the total block copolymer weight.

Other examples of suitable SHDS block copolymers commercially available from Kraton Polymers U.S., LLC under the following KRATON designations G 1650, G 1651, G 1652, G 1654, G 1657, G 1726, GRP 6924 and GRP 6917.

The Functionalized Polyolefin (FP):

Preferred are functionalized homopolymers and copolymers of α-olefins ethylene and propylene.

A preferred functional group is derived from maleic anhydride, but other unsaturated dicarboxylic acid anhydrides diacids, or mixed acid/esters may be used, having the general formula:

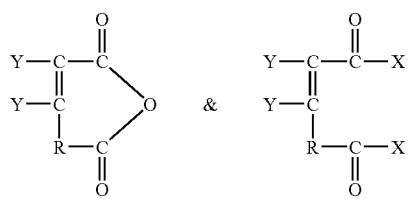

wherein R is an alkylene group having from 0-4 carbon atoms,

Y is preferably hydrogen but may be an organic group such as a branched or straight chain alkyl group, heterocyclic or other organic group of 1-12 carbon atoms, a halogen group such as chlorine, bromine, or iodine and in which at least one, and, both of the X groups are preferably hydroxyl, but one of the X groups may be an alkoxy or aryloxy group having from 1-8 carbon atoms.

For example, the maleic anhydride in the following examples may be substituted in whole or in part with equal molecular equivalents of other unsaturated dicarboxylic acids or anhydrides, such as itaconic acid or anhydride, fumaric acid, maleic acid and the like.

The grafting reaction is carried out in the presence of a peroxide catalyst such as dicumyl peroxide, t-butyl hydroperoxide, benzoyl peroxide, t-butylperoctanoate, di-t-butylperoxide, t-butylhydroperoxide, cumene hydroperoxide, t-butylperbenzoate or other free radical source capable of hydrogen abstraction, as represented by alkyl peroxy esters, alkyl peroxides, alkyl hydroperoxides, diacylperoxides and the like. The amount of catalyst as well as reaction conditions will vary with the choice of catalyst.

The desired results are achieved when the amount of anhydride or diacid grafted onto the polyolefin is within the range of 0.2-5% by wt of the base polyolefin, and preferably in an amount within the range of 0.5-4 percent of the graft. In general, the amount grafted onto the polymer will represent only 30-50 percent of the graft material reacted with the polymer. For example, to achieve a graft of 2 percent maleic anhydride onto polypropylene, a charge of about 6 percent maleic anhydride will be required.

The Plasticizer:

The plasticizer chosen depends in part upon the Mw and particular chemical composition of ingredients of the overmolding TPE but it is essential that the plasticizer be stable and unreactive with any ingredient of the TPE blend, in the temperature range in which the OM layer is molded onto a substrate, from about 400° F.-600° F., while the OM layer is being molded.

Plasticizing oils found useful include oils derived from petroleum, olefin oligomers and low Mw polymers, as well as vegetable and animal oils all of which are relatively high boiling materials, containing only a minor proportion of aromatic hydrocarbons preferably less than 10% by wt of the plasticizing oil. Most preferably the oil is paraffinic.

An oligomer which functions as a plasticizer preferably has a Mw in the range from about 350 to 10,000 and is typically a poly(α-olefin) such as polypropylene, polybutylene, polydodecene, hydrogenated polyisoprene, hydrogenated polybutadiene, hydrogenated polypiperylene, and hydrogenated copolymers of piperylene and isoprene. Vegetable oils referred to above include glyceryl esters of naturally occurring fatty acids and polymerisation products thereof.

Most preferred are paraffinic oils such as DRAKEOL 500, KRAEOL, and PRIMOL 352; and oligomers such as NAPVIS, HYVIS and ETHYLFLO having a viscosity in the range from about 200 1000 SUS (ASTM D455) or a Mw in the range of from 200 to 1,000.

Other Additives

Styrene-Phase Associating Resin:

The resin which associates with the styrene phase, also referred to as a "tackifying resin" because it is compatible with the styrene endblocks, is a resin preferably selected from the group consisting of coumarone-indene, polyindene, poly (methyl indene), polystyrene, vinyltoluene-α-methylstyrene, α-methylstyrene, and polyphenylene ether, in particular poly (2,6-dimethyl-1,4-phenylene ether). Such commercially available resins are: coumarone indene resins, CUMAR Series and CUMAR LX-509 (Neville); hydrocarbon resins PICCO 6000 Series (Hercules), NEVCHEM and LX 685 Series (Neville); α-methyl styrene resins PICCOTEX Series, KRISTALEX Series (Hercules) and AMOCO 18 Series (Amoco); and, polystyrene resins such as PICCOLASTIC D-150 (Hercules) and LX 1035 (Neville). Preferred are the non-polar polystyrene resins with a softening point in the range from about 120° C.-140° C., sold under the "PLAS-TOLYN" trademark.

Rubber-Phase Associating Resin:

In addition to the styrene-phase associating resin, the blend may include a resin, also referred to as a "tackifying resin" because it is compatible with the rubbery phase of the hydrogenated midblock. Suitable rubber phase associating resins include polymerized mixed olefin resins such as "SUPER STA-TAC" rubber phase associating resins include polymerized mixed olefin resins such as "SUPER STA-TAC" (Reichhold); QUINTONE Series (Nippon Zeon); NEVTAC Series (Neville); PICCOTAC 95-BHT Series (Hercules); "ESCOREZ" 2101 (Exxon); WINGTACK Series (Goodyear); ESCOREZ 1300 Series (Exxon); SUPER NEVTAC 99 (Neville); PICCOTAC B (Hercules); STA TAC/R (Reichhold); HERCOTAC AD (Hercules); and BETAPRINE BC (Reichhold); Polyterpene resins such as ZONAREZ 7000 Series (Arizona); ZONATAC Series (Arizona); NIREZ 1000 Series (Reichhold); PICCOFYN A-100 (Hercules); NIREZ V-2040 (Reichhold); PICCOLYTE HM 110 (Hercules); PICCOLYTE A (Hercules); rosin esters such as SYLVATAC Series (Sylvachem); SUPER ESTER A Series (Arakawa); STABELITE Ester 10 (Hercules); FORAL 85 (Hercules); ZONESTER Series (Arizona); FORAL 105 (Hercules); and PENTALYN H (Hercules); and hydrogenated hydrocarbon resins such as ESCOREX 5000 Series (Exxon); ARKON P Series (Arakawa); REGALREZ Series (Hercules) and "SUPER NIREZ 5000" Series (Reichhold). Preferred resins are polymerized mixed olefin resins and others which have a viscosity at 350° F. of no more than 300 centipoise.

Examples of suitable other additives include thixotropes; optical brighteners; antioxidants; UV absorbers and hindered amine or hindered amide light stabilizers; flame retardants; pigments and colorants; processing aids such as lubricants, mold release agents, and slip agents; fragrances; antifoaming agents; antioxidants; antistatic agents; antimicrobials; biocides; and so forth.

The Inert Filler:

The inert filler, whether particulate or fibrous, is necessarily present in the amount indicated, the amount chosen for any particular nylon depending upon the "overmolding duty" or other end-use of the TPE blend. Whether reinforcing or non-reinforcing, fillers are preferably in the size range from 1 μm -150 μm, preferably from 1-45 μm. Fibers (like glass, carbon fibers or carbon fibrils) may be used at the upper end of the range. Inorganic particulate solids, such as calcium carbonate, clays, silica, talc, titanium dioxide, carbon black and the like, and fragments of the above-mentioned fibers may be used at the lower end of the range. Some fillers can serve more than one function. For instance, antimony trioxide functions as a filler and also provides, preferably in combination with other materials, flame retardancy. Preferably from 10-30% by wt of inert filler in the composition provides desirable bonding.

In addition the OM TPE blend may also include less than 1% by wt of heat stabilizers such as hindered phenols and phosphites.

The Nylon Substrate:

Nylons are identified by the number of carbon atoms in the diamine and dibasic acid used to produce them; thus, e.g., nylon 6/6 is a polymer produced by the condensation of hexamethylene diamine and adipic acid. Some nylons are produced by the condensation of only one reactive species, and they are generally produced from a lactam; these nylons are identified by the number of carbon atoms in the monomer used to produce them, thus, e.g., poly(aminocaproic acid) is produced by the polymerization of caprolactam, and it is referred to as "nylon 6". Examples of nylons which may be overmolded with the overmolding TPE are nylon-6; nylon-6, 6; nylon-6,10; nylon-4,6; nylon-6,12; nylon-11; nylon-12; partially aromatic nylon copolymers such as nylon-6/6,T; nylon-6,6/6, I/6,T; and so on, and blends of these. A typical nylon is nylon-6 or nylon-6,6; these and other polyamides are marketed by Allied Corporation under the CAPRON brand, by E. I. duPont de Nemours Company under the ZYTEL brand, by BASF Corporation under the ULTRAMID brand; and by Rilsan Corporation under the BMNO® brand, inter alia. The resins are typically crystalline and high melting. These nylons used for molding typically have number average molecular weights (Mn) of at least about 10,000, preferably in the range from 15,000 to 50,000.

A nylon substrate comprises at least a major proportion by weight of nylon in the compounded nylon. The nylon may include a reinforcing agent, either fibrous or particulate. Useful fiber reinforcements include, without limitation, glass fibers, carbon and graphite fibers, polymeric fibers including aramide fibers, boron filaments, ceramic fibers, metal fibers, asbestos fibers, beryllium fibers, silica fibers, silicon carbide fibers, and so on. The fibers may be conductive and such conductive fibers, for example, conductive carbon fibers or metal fibers, may be used to produce articles for conductive or static charge dissipative applications or EMI shielding. Among these, glass fibers, carbon fibers, and aramid fibers are preferred. Methods of preparing thermoplastic resins that include such fibers are well known in the art. In one method, chopped glass fiber bundles are fed into the melting zone of the extruder that is being used to form the reinforced nylon material. Alternatively, the fiber is introduced as a continuous tow or bundle into a port in the extruder.

Reinforcing agents may include a particulate mineral reinforcing agent. Suitable mineral reinforcing agents include, without limitation, wollastonite, micas, glass beads (solid or hollow), kaolin, and talc. Micas may be treated, for example, with coupling agents such as silanes to improve mechanical properties or with a nickel coating for special applications. Preferred mineral reinforcing agents are wollastonite, mica, kaolin, and talc. Mineral reinforcing agents are typically incorporated into the resin by feeding through a hopper into a melt zone of the extruder.

The reinforcing agent may be a combination of reinforcing fibers and reinforcing minerals. The reinforcing agent is typically present in an amount at least about 5 percent, and up to 25 percent of the weight of the reinforced nylon substrate.

The following examples are provided to illustrate preferred embodiments of the invention.

The following notes apply to parenthetically coded letters in the Tables on the following pages:
(a) maleated SEBS, φ≈1.5-2; ratio of S/EB =30/70;
(b) maleated SEBS, φ≈1; ratio of S/EB =13/87;
(c) maleated polyethylene, MI 30 @190° C./2.16 kg, maleic anhydride 1%;
(d) "standard" SEBS
(e) BASF styrene block copolymer, styrene monomer in midblock, non-hydrogenerated.
(f) 100 parts non-functional styrene block copolymer (KRATON, SEPTON and STYROFLEX) as base for the composition made.
(g) KRATON G 1652 replaces KRATON FG 1901 DRAKEOIL 500 is a mineral oil from Penreco Corporation PLASTOLYN 290 is a heat stable hydrocarbon resin having a Mw=6040, Mn=1670, and Mz<20,000 with a melt viscosity of 10 poise @230° C KEMAMIDE is a fatty acid amide lubricant VICRON 25-11 is an essentially pure calcium carbonate powder Table 1 presents illustrative examples of seven (7) compositions in which the ingredients are varied to observe the expected effect, after molding, on hardness, tensile strength and elongation %, of making various changes. The physical properties of the molded composition are at least as important as the ability of the composition to provide a good bond which is satisfactory for the purpose at hand.

In Table 1, example #1 is a prior art composition in which 120 phr KRATON FG 1901, a "higher functional" rubber (functionality from about 1.5%-2%) is used in combination with 100 phr of a non-functionalized hydrogenated KRATON G1654 SBS block copolymer and 170 phr of filler particles.

In Ex. #2 the G1654 is replaced with KRATON A6935, other ingredients being substantially in the same proportions.

In Exs. # 3-# 7 other variations are illustrated.

Table 2 presents a series of four (4) additional illustrative examples in each of which the A6935 is maintained in the same amount as in Ex. # 7; each of the five examples shown includes both a unifunctional and a higher functional rubber in combinations with proportions varied, some with filler, some without, some with POLYBOND, some without.

Table 3 presents three examples in which there is no POLYBOND and no functionalized SHDS rubber, but uses either hydrogenated A6935 or non-hydrogenated Styroflex, or both.

Table 4 presents a comparison of compositions # 15 and # 16 with prior art # 1, to show that the presence of unifunctional KRATON FG1924 alone, is effective; and it is effective even when half of it is replaced with higher functional KRATON FG 1901.

With respect to the Tables:

The ingredients identified by trademarks in the TABLES have not been capitalized because, from the foregoing and subsequent extensive designation of the identified ingredients being registered trademarks, it is abundantly clear that they are trademarks in each of the Tables; moreover, the Tables, which have been printed with the minimum acceptable size of "12" in Times New Roman font, are barely able to be fitted between the margins of some of the pages. Capitalization of the trademarks will force expansion of the first column enough so as to have the Tables exceed the allowable margins of each page.

Table 5 presents the various levels of bonding obtained with five (5) different nylon substrates which are identified below, each at varying degrees of severity of molding conditons, to provide evidence that the claimed composition is effective on any nylon substrate.

TABLE 1

| Ingredient | 1 phr | 1 % | 2 phr | 2 % | 3 phr | 3 % | 4 phr | 4 % | 5 phr | 5 % | 6 phr | 6 % | 7 phr | 7 % |
|---|---|---|---|---|---|---|---|---|---|---|---|---|---|---|
| Kraton A6935 (f) | | | 100 | 17.09 | 50 | 10.79 | | | 100 | 15.50 | 100 | 13.42 | 100 | 14.81 |
| Kraton G1654 (d) (f) | 100 | 17.09 | | | | | 50 | 8.55 | | | | | | |
| Styroflex 2G66 (e) (f) | | | | | 50 | 10.79 | 50 | 8.55 | | | | | | |
| Drakeol 500 | 150 | 25.63 | 150 | 25.63 | 100 | 21.58 | 150 | 25.64 | 150 | 23.25 | 150 | 20.13 | 150 | 22.22 |
| Kraton 1901 (a) | 120 | 20.51 | 120 | 20.51 | 84 | 18.13 | 120 | 20.51 | 100 | 15.50 | | | 50 | 7.41 |
| Kraton 1924 (b) | | | | | | | | | | | 120 | 16.10 | 50 | 7.41 |
| Plastolyn 290 | 40 | 6.84 | 40 | 6.84 | 33 | 7.12 | 40 | 6.84 | 40 | 6.20 | 40 | 5.37 | 40 | 5.92 |
| Vicron 25-11 | 170 | 29.05 | 170 | 29.05 | 142 | 30.65 | 170 | 29.06 | 170 | 26.35 | 170 | 22.81 | 170 | 25.18 |
| Polybond 3109 (c) | | | | | | | | | 80 | 12.4 | 160 | 21.47 | 110 | 16.29 |
| Kemamide B | 4 | 0.68 | 4 | 0.68 | 3.5 | 0.76 | 4 | 0.68 | 4 | 0.54 | 4 | 0.59 | 4 | 0.59 |
| Irganox 1010 | 1.2 | 0.21 | 1.2 | 0.21 | 0.8 | 0.17 | 1 | 0.17 | 1.2 | 0.16 | 1.2 | 0.16 | 1.2 | 0.2 |
| Hardness, Shore A | 39 | | 41 | | 54 | | 50 | | 60 | | 72 | | 68 | |
| Tens. strength, psi | 500 | | 450 | | 580 | | 500 | | 490 | | 370 | | 400 | |
| Elongation, % | 210 | | 200 | | 610 | | 480 | | 290 | | 290 | | 140 | |

TABLE 2

| Ingredient | 7 phr | 7 % | 8 phr | 8 % | 9 phr | 9 % | 10 phr | 10 % | 11 phr | 11 % |
|---|---|---|---|---|---|---|---|---|---|---|
| Kraton A6935 | 100 | 14.81 | 100 | 16.52 | 100 | 19.79 | 100 | 17.69 | 100 | 25.30 |
| Kraton G1654 (d) | | | | | | | | | | |
| Styroflex 2G66 (e) | | | | | | | | | | |

TABLE 2-continued

| Ingredient | 7 phr | 7 % | 8 phr | 8 % | 9 phr | 9 % | 10 phr | 10 % | 11 phr | 11 % |
|---|---|---|---|---|---|---|---|---|---|---|
| Drakeol 500 | 150 | 22.22 | 150 | 24.79 | 150 | 29.69 | 150 | 26.54 | 150 | 37.96 |
| Kraton 1901 (a) | 50 | 7.41 | 50 | 8.26 | 50 | 9.90 | 60 | 10.62 | 60 | 15.18 |
| Kraton 1924 (b) | 50 | 7.41 | 50 | 8.26 | 50 | 9.90 | 40 | 7.08 | 40 | 10.12 |
| Plastolyn 290 | 40 | 5.92 | 40 | 6.61 | 40 | 7.92 | 40 | 7.08 | 40 | 10.12 |
| Vicron 25-11 | 170 | 25.18 | 100 | 16.5 | | | 170 | 30.08 | | |
| Polybond 3109 (c) | 110 | 16.29 | 110 | 18.18 | 110 | 21.77 | | | | |
| Kemamide B | 4 | 0.59 | 4 | 0.66 | 4 | 0.79 | 4 | 0.71 | 4 | 1.01 |
| Irganox 1010 | 1.2 | 0.2 | 1.2 | 0.20 | 1.2 | 0.24 | 1.2 | 0.21 | 1.2 | 0.30 |
| Hardness, Shore A | 68 | | 63 | | 58 | | 35 | | 26 | |
| Tens. strength, psi | 400 | | 380 | | 370 | | 350 | | 320 | |
| Elongation, % | 140 | | 350 | | 450 | | 500 | | 350 | |

TABLE 3

| Ingredient | 12 phr | 12 % | 13 phr | 13 % | 14 phr | 14 % |
|---|---|---|---|---|---|---|
| Kraton A6935 | 100 | 17.09 | 50 | 10.79 | | |
| Septon 4044 (f) | | | | | 100 | 17.1 |
| Styroflex 2G66 (e) | | | | | | |
| Drakeol 500 | 150 | 25.63 | 100 | 21.58 | 120 | 20.51 |
| Kraton 1901 (a) | | | | | | |
| Kraton G1652 (g) | 120 | 20.51 | 84 | 18.13 | 120 | 20.51 |
| Plastolyn 290 | 40 | 6.84 | 33 | 7.12 | 40 | 6.84 |
| Vicron 25-11 | 170 | 29.05 | 142 | 30.65 | 170 | 29.06 |
| Polybond 3109 (c) | | | | | | |
| Kemamide B | 4 | 0.68 | 3.5 | 0.76 | 4 | 0.68 |
| Irganox 1010 | 1.2 | 0.21 | 0.8 | 0.8 | 1 | 0.17 |
| Hardness, Shore A | 42 | | 55 | | 40 | |
| Tens. strength, psi | 480 | | 600 | | 480 | |
| Elongation, % | 230 | | 630 | | 230 | |

TABLE 4

| Ingredient | 1 phr | 1 % | 15 phr | 15 % | 16 phr | 16 % |
|---|---|---|---|---|---|---|
| Kraton A6935 (f) | | | | | | |
| Kraton G1654 (d) (f) | 100 | 17.09 | 100 | 17.09 | 100 | 17.09 |
| Styroflex 2G66 (e) (f) | | | | | | |
| Drakeol 500 | 150 | 25.63 | 150 | 25.63 | 150 | 25.63 |
| Kraton 1901 (a) | 120 | 20.51 | | | 60 | 10.25 |
| Kraton 1924 (b) | | | 120 | 20.51 | 60 | 10.25 |
| Plastolyn 290 | 40 | 6.84 | 40 | 6.84 | 40 | 6.84 |
| Vicron 25-11 | 170 | 29.05 | 170 | 29.05 | 170 | 29.05 |
| Polybond 3109 (c) | | | | | | |
| Kemamide B | 4 | 0.68 | 4 | 0.68 | 4 | 0.68 |
| Irganox 1010 | 1.2 | 0.21 | 1.2 | 0.21 | 1.2 | 0.21 |
| Hardness, Shore A | 39 | | 35 | | 38 | |
| Tens. strength, psi | 500 | | 350 | | 430 | |
| Elongation, % | 210 | | 510 | | 520 | |

TABLE 5

Barrel temperature profile I

| | Formula No. | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Substrate A | No | No | No | No | No | 15 | 18 | 16 | No | 14 | No | No | No | No | No | No |
| Substrate B | No | No | No | No | No | 17 | 18 | 17 | No | 14 | No | No | No | No | No | No |
| Substrate C | No | No | No | No | No | 18 | 18 | 17 | No | 14 | No | No | No | No | No | No |
| Substrate D | No | No | No | No | No | 17 | 17 | 16 | No | 14 | No | No | No | No | No | No |
| Substrate E | No | No | No | No | No | 17 | 17 | 16 | No | 14 | No | No | No | No | No | No |

Barrel temperature profile II

| | Formula No. | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Substrate A | No | 12 | 12 | 8 | 8 | n/a | n/a | No | 13 | No | No | No | No | 14 | No |
| Substrate B | No | 12 | 9 | 7 | 12 | n/a | n/a | No | 14 | No | No | No | No | 13 | No |
| Substrate C | No | 12 | 11 | 10 | 13 | n/a | n/a | No | 14 | No | No | No | No | 12 | No |
| Substrate D | No | 13 | 11 | 9 | 10 | n/a | n/a | No | 13 | No | No | No | No | 12 | No |
| Substrate E | No | No | 10 | 7 | 7 | n/a | n/a | No | 13 | No | No | No | No | 12 | No |

Barrel temperature profile III

| | Formula No. | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Substrate A | No | 16 | 20 | 21 | 17 | n/a | n/a | No | n/a | No | No | No | No | 13 | 14 |
| Substrate B | No | 17 | 21 | 22 | 18 | n/a | n/a | No | n/a | No | No | No | No | 14 | 13 |
| Substrate C | No | 17 | 20 | 20 | 18 | n/a | n/a | No | n/a | No | No | No | No | 12 | 13 |

TABLE 5-continued

| Substrate D | No | 17 | 19 | 18 | 17 | n/a | n/a | n/a | No | n/a | No | No | No | No | 12 | 12 |
| Substrate E | No | 17 | 18 | 18 | 17 | n/a | n/a | n/a | No | n/a | No | No | No | No | 12 | 12 |

(i) the control blend # 1, made with "standard" KRATON G 1654 (hydrogenated but non-functionalized) in combination with KRATON 1901 (functionality 1.5 ≈2) has excellent tensile strength and elongation, but provides no bonding even at Profile III conditions;

(ii) blend # 2 is made by substituting A6935 for G1654, other components being essentially the same; the blend provides high tensile strength and elongation, and is quite soft (A 41); however good bonding is provided only under Profile II and III conditions—evidence that A6935 with a higher functional SHDS (≈1.5% ) provides good and superior bonding at Profile II and III conditions, respectively.

(iii) blend # 3 is made with hydrogenated A6935 and non-hydrogenated STYROFLEX 50/50 and is found to provide higher hardness, tensile strength and elongation than with A6935 alone; though bonding at Profile II conditions is substantially the same as with blend # 2, the bonding at Profile III conditions is much better.

(iv) blend # 4 is made by substituting G1654 for the A6935 in blend # 3 with the result that the tensile strength is about the same and the hardness is only slightly lower than that for blend # 3, but the elongation is substantially lower. Bonding at Profile II conditions is slightly poorer than with blend # 3, but bonding at Profile III conditions is excellent.

(v) blend # 5, is made with a combination of KRATON FG1901 and A6935, but no unifunctional FG1924. Bonding at Profile II conditions is good, but at Profile III conditions is superior, due at least in part to the presence of the POLYBOND. is substituted for KRATON 1901 results in better tensile strength and elongation than blend 269-007B and only slightly lower hardness, but uses 10 parts less rubber, indicating that the KRATON 1901 contributes good mechanical properties;

(vi) in blend # 6, unifunctional KRATON FG1924 is substituted for FG1901 in blend #5 in a combination with KRATON A6935; as is evident, the hardness is improved over that of blend # 5, the elongations are the same, but the tensile strength of blend # 6 is lower. In each case, the hardness tailored with POLYBOND 3109 results in relatively low tensile strength and elongation. However, blend # 6 provides excellent bonding at all Profiles. The control which uses standard SEBS (KRATON G1654) instead of KRATON A6935 provides no bonding and is much softer.

(vii) by substituting FG1901 for FG1924 in a 50/50 ratio, the resulting blend # 7 is only slightly softer, has about the same tensile strength, but has substantially lower elongation. Like blend # 6, the bonding of blend # 7 is superior at all Profiles.

Referring to Tables 2 and 5, it is evident that:

(viii) blend # 8 has 8.7% less of the same inert filler used in blend # 7, all other ingredients being about the same. The surprising result is that the lower percentage of inert filler results in lower hardness and higher elongation, as one would expect, but in lower tensile strength. However, like blend # &, blend # 8 provides excellent bonding at all Profiles.

(ix) blend # 9 is substantially the same as blend # 8, except that there is no inert filler. The hardness, tensile strength and elongation are not much different from those for blend # 8, but quite surprisingly, blend # 9 provides no satisfatory bonding irrespective of the Profile conditions.

(x) to determine the effect of using the inert filler to provide hardness while removing the POLYBOND, blend # 9 was made. The filler actually decreased the hardness a little, made substantially no difference on tensile strength and elongation, but quite surprisingly, resulted in excellent bonding at Profile 1 & II conditions and also at Profile III conditions (data not entered). The peel strengths recorded do not adequately reflect how good the bonding was, because of weak tensile strength and low hardness.

(xi) in blend # 11, both the inert filler and the POLYBOND are left out; the bonding relies on the combination of A6935 with unifunctional FG1924 and higher functional FG1901. The hardness, tensile strength and elongation are substantially the same as that for blend # 10, but the blend fails to provide satisfactory bonding under any Profile conditions.

Referring to Tables 3 and 5, it is evident that:

(xii) though blend # 12 is a combination of A6935 and inert filler, using G1652 to replace the FG1901 in blend # 2, results in unsatisfactory bonding at all Profiles.

(xiii) as might be expected, replacing 50% of the A6935 in blend # 12 with Styroflex provides no satisfactory bonding at all Profiles, but improves both tensile strength and elongation.

(xiv) as might be expected, replacing the A6935 and STYROXFLEX in blend # 13 with SEPTON 4044, a non-functionalized hydrogenated SHDS, provides no satisfactory bonding at all Profiles, and decreases both tensile strength and elongation.

(xv) blend # 15 is made with only unifunctional FG1924, no A6935, no FG1901, and no POLYBOND, but uses a combination of inert filler and G1654 to provide a soft blend (35A) with acceptable tensile strength and good elongation. Most surprisingly, FG1924 has the unique ability to provide good bonding at Profile II and III conditions. As before, the peel strengths recorded do not adequately reflect how good the bonding was, because of weak tensile strength and low hardness.

(xvi) in blend # 16, 50% of the FG1924 is substituted with FG1901 with only a slight improvement in tensile strength. Though bonding under Profile I and II conditions is unsatisfactory, bonding at Profile III conditions is excellent. As before, the peel strengths recorded do not adequately reflect how good the bonding was, because of weak tensile strength and low hardness.

The data presented in Table 5 are average values, obtained on each of the blends listed in Tables 1-5, is derived for adhesion by overmolding a layer 1.5 mm thick on each of the following five different nylon substrates, each of which was differently aged.

Substrate A: commercially available CAPRON 8333GHI—glass fiber reinforced and impact modified Nylon 6. Plaques of this substrate A are molded 3 months prior to being overmolded with the test blends; the plaques are stored in a closed box. After being stored two months, that is, one month prior to being overmolded, the plaques are removed from the box and exposed to ambient humidity of about 70-80% at room temperature (23° C.).

Substrate B: commercially available ZYTEL 409AHS—heat stabilized nylon 6,6. Plaques of this substrate B are molded then allowed to age while exposed to ambient humidity of about 70-80% at room temperature (23° C.) for 6 months. The aged plaques are then overmolded with the test blends.

Substrate C: commercially available CAPRON 8333GHI—nylon 6. Plaques of this substrate C are molded, then aged by exposing them to ambient humidity of about 70-80% at room temperature (23° C.) for 1 month. The aged plaques are then immersed in water for 24 hr, wiped dry and allowed to dry further at room temperature for 12 hr before being overmolded with the test blends.

Substrate D: commercially available CAPRON 8333GHS, nylon 6. Plaques of this substrate D are molded, aged and wetted the same as plaques of substrate C above, except that they are overmolded immediately after they are wiped dry with tissue paper.

Substrate E: commercially available ZYTEL 801AHS—heat stabilized nylon 6,6. Plaques of this substrate E are molded then allowed to age while exposed to ambient humidity of about 70-80% at room temperature (23° C.) for 3 months. The aged plaques are then overmolded with the test blends.

The Peel Test:

This test is carried out in an Instron tensilometer, Model No. 5564. The substrate is clamped to the bed of the machine. One edge of the overmolded layer (1.5 mm thick) is then clamped to vertical jaws which pull the layer vertically upwards at an angle of 90 degrees at a peel speed of 5.08 cm/min (2 in/min).

The measurement of adhesion is registered in lb/in.

When the adhesion is <11.73 kg/cm (10 lb/in), the bond is deemed too weak to be satisfactory;

when the adhesion is in the range from 11.73-17.3 kg/cm (10-15 lb/in), the adhesion is deemed good; and, when the adhesion is >17.3 kg/cm (15 lb/in), the adhesion is deemed superior.

The blends are molded at three temperature levels in which three profiles of barrel temperatures are used, starting at just below the hopper and ending at the nozzle. The first profile is "normal" or "low", referred to as Profile I; the second Profile II is referred to as "medium" or "normal plus"; and the third Profile III is referred to as "hot".

Barrel temps. in Profile I are as follows: 182, 249, 260, 260. (° C. normal) or, 360, 480, 500, 500. (° F. normal)

Barrel temps. in Profile II are as follows: 182, 260, 271, 271. (° C. normal plus) or, 360, 500, 520, 520. (° F. normal plus)

Barrel temps. in Profile III are as follows: 182, 271, 282, 282. ° C. hot) or, 360, 520, 540, 540. (° F. hot)

Injection speed is 5.08 cm/sec (2 in/sec).

The measured adhesions, in lb/in, for each of the blends on each of the substrates, using the barrel temperatures in each of the Profiles I, II and III, are listed sequentially in Table 5 above. The designation "no" in lieu of a measurement in each Table indicates that the overmolded layer could be manually debonded, indicating the bonding was not satisfactory. The designation N/A is used to indicate that since bonding at the lower barrel temperature profile was good, it could be no worse at Profile III conditions, and is usually better, therefore was unnecessary to measure the bonding.

What is claimed is:

1. A thermoplastic elastomer ("TPE") composition for overmolding a predominantly nylon substrate consisting essentially of, an essentially polyamide-free blend of, (a) an inert filler present in an amount in the range from 5 to 40% by weight of the composition, (b) from 10-45 parts of a plasticizer per 100 parts of formulated composition, unreactive with an ingredient in the composition, the plasticizer selected from the group consisting of paraffinic oils, olefin oligomers and low Mw polymers;

(c) a block copolymer selected from the group consisting of (C1), a polystyrene-polydiene-polystyrene block copolymer (SDS rubber), or an at least partially hydrogenated polystyrene-polydiene-polystyrene block copolymer (SHDS rubber), the SDS and SHDS each having "small" polystyrene endblocks, one at each end of a polydiene midblock, which midblock includes a controlled distribution block of polystyrene, the "small" polystyrene endblocks being together present in an amount in the range from about 20% to 30% by weight of the block copolymer, not including the polystyrene in the polydiene midblock, so that (C1) has a weight average molecular weight ("Mw") high enough to be thermally stable at 282° C. (540° F.), (C2), a functionalized at least partially hydrogenated "high rubber" SHDS having a functionality of essentially 1%, the "small" endblocks together present in an amount in the range from about 8-25% by weight, and (C3), a functionalized at least partially hydrogenated SHDS having a functionality of >1% but <2%, in which the end blocks are together present in an amount in the range from >25%-35% by weight;

in any combination, provided that only (C2) may be present by itself, (C1) and (C3) always requiring at least one of the other block copolymers in combination;

(d) from 0-30% by weight of the composition, of a functionalized polyolefin (FP), the olefin having from 2 to 8 carbon atoms;

(e) from 0-15% by wt of the composition, of a hydrogenated nonfunctionalized hydrogenated polystyrene-polydiene-polystyrene (SHDS) block coplymer; and, (f) an additive to enhance the useful life of the composition.

2. The composition of claim 1 wherein, in (C1), the polymerized vinyl aromatic monomer in the polydiene midblock is polystyrene; the polydiene midblock is selected from hydrogenated polybutadiene, polyisoprene, and poly(isoprene/butadiene); and, (C1) has a molecular weight Mw in the range from 20,000-400,000.

3. The composition of claim 2, wherein (C2) is present in an amount in the range from 5-25% by weight of the composition, and has a molecular weight in the range from 20,000-300,000;

(C3) is present in an amount in the range from 5-25% by weight of the composition and has a molecular weight in the range from 20,000-300,000; and, plasticizer (b) is present in an amount from 10-40% by weight of the composition.

4. The composition of claim 3, including from 1-20% of a substantially fully hydrogenated, non-functionalized SDS ("SHDS").

5. The composition of claim 2, wherein (C1) and (C3) are absent, and (C2) is present in an amount from 10-40% by weight of the composition.

6. The composition of claim 1 wherein each functionalized SHDS is functionalized with a polar group selected from the group consisting of acid anhydride, carboxyl, carboxylic acid, and amine epoxy.

7. The composition of claim 1 wherein, if the functionalized polyolefin is present, the olefin is selected from ethylene and propylene, and the polyolefin is functionalized with maleic anhydride present in an amount from 0.5-4% of the grafted polymer.

8. A process for the preparation of an article comprising bonding a thermoplastic elastomeric overmolding composition to a nylon substrate, the process comprising, heating a composition according to claim 1 to a temperature in the range from about 182° C.-282° C. (360° F.-540° F.), followed by combining the heated composition with the polar substrate so as to overlie at least a portion of the substrate.

9. An article of arbitrary shape having a layer of the composition of claim 1 molded to at least a portion of the article's surface.

* * * * *